United States Patent
Nozaki (10) Patent No.: US 11,541,756 B2
(45) Date of Patent: Jan. 3, 2023

(54) DRIVE SYSTEM FOR HYBRID VEHICLE

(71) Applicant: TOYOTA JIDOSHA KABUSHIKI KAISHA, Toyota (JP)

(72) Inventor: Takeshi Nozaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 17/172,355

(22) Filed: Feb. 10, 2021

(65) Prior Publication Data

US 2021/0284028 A1 Sep. 16, 2021

(30) Foreign Application Priority Data

Mar. 12, 2020 (JP) .............................. JP2020-042891

(51) Int. Cl.
*B60L 3/00* (2019.01)
*B60L 50/51* (2019.01)
(Continued)

(52) U.S. Cl.
CPC ............ *B60L 3/0061* (2013.01); *B60L 50/51* (2019.02); *B60W 10/06* (2013.01); *B60W 10/08* (2013.01); *B60W 20/40* (2013.01); *B60W 20/50* (2013.01); *B60L 2210/12* (2013.01); *B60L 2210/42* (2013.01); *B60L 2240/547* (2013.01); *B60W 2510/242* (2013.01)

(58) Field of Classification Search
CPC .... B60L 3/0061; B60L 3/0046; B60L 3/0084; B60L 50/51; B60L 2210/12; B60L 2210/42; B60L 2240/547; B60W 10/06; B60W 10/08; B60W 20/40; B60W 20/50; B60W 2510/242

See application file for complete search history.

(56) References Cited

U.S. PATENT DOCUMENTS

| | | | | |
|---|---|---|---|---|
| 2013/0035819 | A1* | 2/2013 | Wolft | B60L 3/0046 701/22 |
| 2015/0054517 | A1* | 2/2015 | Yonezaki | B60L 3/0046 324/418 |

(Continued)

FOREIGN PATENT DOCUMENTS

| | | |
|---|---|---|
| JP | 2005229689 A | 8/2005 |
| JP | 2007252082 A | 9/2007 |

(Continued)

*Primary Examiner* — George C Jin
(74) *Attorney, Agent, or Firm* — Hunton Andrews Kurth LLP (57) ABSTRACT

A controller of a drive system is configured to, when a power switch is changed from an on state to an off state in a situation in which it has been diagnosed that an abnormality is occurring in a motor generator, execute a starting check process of checking a drive circuit and an engine starting process of starting an engine. The starting check process includes a voltage reduction process of driving a DC-DC converter until a capacitor voltage becomes lower than or equal to a prescribed voltage. The controller is configured to, on condition that the controller determines through a voltage reduction determination process that the capacitor voltage is reduced as compared to the capacitor voltage at an end of the voltage reduction process, execute the engine starting process.

6 Claims, 4 Drawing Sheets

(51) Int. Cl.
    *B60W 10/08*     (2006.01)
    *B60W 10/06*     (2006.01)
    *B60W 20/50*     (2016.01)
    *B60W 20/40*     (2016.01)

(56) References Cited

U.S. PATENT DOCUMENTS

| | | |
|---|---|---|
| 2015/0231972 A1 | 8/2015 | Oi et al. |
| 2019/0149063 A1* | 5/2019 | Onda .................. B60L 3/003 361/30 |

FOREIGN PATENT DOCUMENTS

| | | |
|---|---|---|
| JP | 2008168754 A | 7/2008 |
| JP | 2008228504 A | 9/2008 |
| JP | 2008306795 A | 12/2008 |
| JP | 2015156761 A | 8/2015 |

* cited by examiner

DRIVE SYSTEM FOR HYBRID VEHICLE

CROSS-REFERENCE TO RELATED APPLICATION

This application claims priority to Japanese Patent Application No. 2020-042891 filed on Mar. 12, 2020, incorporated herein by reference in its entirety.

BACKGROUND

1. Technical Field

The disclosure relates to a drive system for a hybrid vehicle.

2. Description of Related Art

Japanese Unexamined Patent Application Publication No. 2005-229689 (JP 2005-229689 A) describes an example of a motor drive apparatus for a vehicle including a motor for driving the vehicle and a drive circuit for the motor. The drive circuit of the motor drive apparatus includes a system main relay and an inverter. The inverter converts the direct-current voltage of a high-voltage battery, input via the system main relay, to an alternating-current voltage and outputs the alternating-current voltage to the motor. The drive circuit further includes a capacitor and a DC-DC converter. The capacitor is disposed between the system main relay and the inverter in a path for supplying an electric power from the high-voltage battery to the motor. The DC-DC converter steps down the direct-current voltage of the high-voltage battery. The direct-current voltage stepped down by the DC-DC converter is input to a low-voltage battery. When the direct-current voltage of the high-voltage battery is input to the inverter via the system main relay, the direct-current voltage of the high-voltage battery is also input to the capacitor, so an electric charge is stored in the capacitor.

In the above motor drive circuit, when a power switch is changed from an on state to an off state by operation of a driver of the vehicle, a voltage reduction process of reducing the voltage of the capacitor in a state where the switches of the system main relay are off is executed. JP 2005-229689 A describes an example of the voltage reduction process that is executed when a motor abnormality is detected. In the voltage reduction process in the case where a motor abnormality is detected, the DC-DC converter is driven by using the voltage of the capacitor. As a result, the voltage of the capacitor is reduced.

In the voltage reduction process in the case where no motor abnormality is detected, the voltage of the capacitor is reduced by driving the inverter with the voltage of the capacitor.

SUMMARY

It is known that, when the direct-current voltage input to the DC-DC converter is lower than or equal to a prescribed voltage, the DC-DC converter is not driven normally. Therefore, to protect the DC-DC converter, the voltage reduction process of driving the DC-DC converter is ended when the voltage of the capacitor changes from a state higher than the prescribed voltage to a state lower than or equal to the prescribed voltage. For this reason, the voltage of the capacitor at the end of the voltage reduction process when the voltage reduction process of driving the DC-DC converter is executed is higher than that when the voltage reduction process of driving the inverter is executed.

Here, when the power switch is turned on by operation of the driver, a starting check process is executed in the vehicle. Then, when no abnormality is detected through the starting check process, power sources of the vehicle, such as an engine and the motor, are started up.

When the voltage reduction process of reducing the voltage of the capacitor is executed without driving the inverter at the time when the power switch has been turned off last time as described above, the voltage of the capacitor can be high when the power switch is turned on thereafter. When the power switch is turned on in a state where the voltage of the capacitor is high, an abnormality may be detected through the starting check process although no abnormality is occurring in the motor drive circuit, and the engine may not be started.

A drive system for a hybrid vehicle as a solution to the above inconvenience is applied to a hybrid vehicle including an engine and a motor as power sources of the vehicle. The drive system includes a drive circuit connected to a high-voltage battery, and a controller configured to control the engine and the motor. The drive circuit includes an inverter configured to drive the motor by converting a direct-current voltage of the high-voltage battery to an alternating-current voltage and outputting the alternating-current voltage to the motor, a positive power line that is a power line connecting a positive electrode of the high-voltage battery and the inverter, a negative power line that is a power line connecting a negative electrode of the high-voltage battery and the inverter, a system main relay having a first switch disposed in the positive power line and a second switch disposed in the negative power line, a capacitor disposed between the system main relay and the inverter in a power supply path from the high-voltage battery to the inverter, a first end of the capacitor being connected to the positive power line, a second end of the capacitor being connected to the negative power line, a discharge resistor disposed in parallel with the capacitor, a voltage sensor configured to detect a voltage of the capacitor as a capacitor voltage, and an electrically-powered device connected to both a portion between the first switch and the inverter in the positive power line and a portion between the second switch and the inverter in the negative power line. The controller is configured to execute a motor abnormality diagnosis process of diagnosing whether an abnormality is occurring in the motor, a voltage reduction process of, when a power switch of the hybrid vehicle is changed from an on state to an off state in a situation in which it has been diagnosed through the motor abnormality diagnosis process that an abnormality is occurring in the motor, driving the electrically-powered device until the capacitor voltage becomes lower than or equal to a prescribed voltage, a starting check process of, when the power switch is changed from the off state to the on state, checking the drive circuit, and an engine starting process of starting the engine. The starting check process includes a voltage reduction determination process of determining whether the capacitor voltage is reduced as compared to the capacitor voltage at an end of the last voltage reduction process. The controller is configured to, on condition that the controller determines through the voltage reduction determination process that the capacitor voltage is reduced as compared to the capacitor voltage at the end of the last voltage reduction process, execute the engine starting process.

With the above configuration, when the power switch is turned off in a situation in which it has been diagnosed that an abnormality is occurring in the motor, the voltage reduction process of reducing the capacitor voltage by driving the electrically-powered device is executed. The voltage reduction process is ended when the capacitor voltage becomes lower than or equal to the prescribed voltage. During a period in which the power switch is in the off state, a natural discharge of the capacitor occurs, that is, the voltage of the capacitor naturally decreases, due to the discharge resistor disposed in parallel with the capacitor. When the power switch is turned on thereafter, the voltage reduction determination process is executed as the starting check process. In the voltage reduction determination process, it is determined whether the capacitor voltage is reduced as compared to the capacitor voltage at the end of the last voltage reduction process. When it is determined that the capacitor voltage is reduced as compared to the capacitor voltage at the end of the last voltage reduction process, the engine may be started even when an abnormality is occurring in the motor, and, by extension, the hybrid vehicle is able to be driven.

In the above drive system, the controller may be configured to, in the voltage reduction determination process, when an elapsed time from the end of the last voltage reduction process is longer than or equal to a determination time, determine that the capacitor voltage is reduced as compared to the capacitor voltage at the end of the last voltage reduction process.

The amount of discharge of the capacitor due to the discharge resistor disposed in parallel with the capacitor increases with time. In other words, when an elapsed time from the end of the last voltage reduction process is sufficiently long, it may be estimated that the voltage of the capacitor is sufficiently low. With the above configuration, when an elapsed time from the end of the last voltage reduction process is longer than or equal to the determination time, it is determined that the capacitor voltage is reduced as compared to the capacitor voltage at the end of the last voltage reduction process. Therefore, the engine is able to be started.

In the above drive system, the controller may be configured to, in the voltage reduction determination process, when a voltage reduction amount that is an amount of reduction in the capacitor voltage from the end of the last voltage reduction process is greater than or equal to a determination reduction amount, determine that the capacitor voltage is reduced as compared to the capacitor voltage at the end of the last voltage reduction process.

Since the discharge resistor is disposed in parallel with the capacitor, the voltage of the capacitor decreases in a period from the end of the last voltage reduction process to the time when the power switch is turned on. In other words, when the power switch is normal, the capacitor voltage detected by the voltage sensor at the time when the power switch is turned on should be lower than the capacitor voltage at the end of the last voltage reduction process.

With the above configuration, in the voltage reduction determination process, when the voltage reduction amount is greater than or equal to the determination reduction amount, it may be determined that the voltage sensor is normal, so the engine is able to be started even when an elapsed time from the end of the last voltage reduction process is shorter than the determination time. In other words, even when the elapsed time is shorter than the determination time, the hybrid vehicle is able to be driven.

On the other hand, in the voltage reduction determination process, when the voltage reduction amount is not greater than or equal to the determination reduction amount, it may be determined that the voltage sensor is not normal, so it is not determined that the capacitor voltage is reduced as compared to the capacitor voltage at the end of the last voltage reduction process. As a result, the engine is not started. Therefore, it is possible to prevent the hybrid vehicle from being driven in a situation in which an abnormality is occurring in one or some components of the drive circuit.

In one mode of the above drive system, the controller may be configured to execute a precharge process of increasing the capacitor voltage by setting both the first switch and the second switch in an on state. In this case, the starting check process may include a relay abnormality determination process of determining whether the capacitor voltage increases in a state where only one of the first switch and the second switch is turned on. The controller may be configured to, when the controller determines through the voltage reduction determination process that the capacitor voltage is reduced as compared to the capacitor voltage at the end of the last voltage reduction process, execute the relay abnormality determination process, and, on condition that the controller does not determine through the relay abnormality determination process that the capacitor voltage increases, execute the precharge process and the engine starting process.

When both the first switch and the second switch are normal, even when only one of the first switch and the second switch is turned on, the direct-current voltage of the high-voltage battery is not input to the capacitor, so the voltage of the capacitor does not increase. On the contrary, when a welding abnormality is occurring in at least any one of the first switch and the second switch, the direct-current voltage of the high-voltage battery is input to the capacitor when one of the switches is turned on, with the result that the voltage of the capacitor can increase.

When it is determined through the voltage reduction determination process that the capacitor voltage is reduced as compared to the capacitor voltage at the end of the last voltage reduction process, it may be determined that the voltage sensor is functioning normally. For this reason, when the direct-current voltage of the high-voltage battery is input to the capacitor as a result of operation of the system main relay, it is possible to detect a change in the capacitor voltage.

In the above configuration, in advance of execution of the precharge process, a relay abnormality determination process is executed. In the relay abnormality determination process, only one of the first switch and the second switch is turned on, and it is determined in this state whether the capacitor voltage increases. When it is not determined that the capacitor voltage increases, it may be determined that no welding abnormality is occurring in the other one of the first switch and the second switch, so it is possible to execute the precharge process and the engine starting process.

In one mode of the above drive system, the controller may be configured to, when both a condition that an amount of increase in the capacitor voltage due to execution of the precharge process is greater than or equal to a determination increase amount and a condition that a difference between the direct-current voltage of the high-voltage battery and the capacitor voltage is less than or equal to a determination difference are satisfied before an execution time of the precharge process reaches a determination execution time, end the precharge process and allow operation of the engine. On the other hand, the controller may be configured to, at least one of the condition that an amount of increase in the capacitor voltage due to execution of the precharge process is greater than or equal to the determination increase amount and the condition that a difference between the direct-current voltage of the high-voltage battery and the capacitor voltage is less than or equal to the determination difference is not satisfied even when the execution time of the precharge process reaches the determination execution time, end the precharge process and prohibit operation of the engine.

With the above configuration, the determination increase amount and the determination difference are set such that, when the amount of increase in the capacitor voltage due to execution of the precharge process is greater than or equal to the determination increase amount and the difference between the direct-current voltage of the high-voltage battery and the capacitor voltage is less than or equal to the determination difference, it may be determined that the system main relay is operating normally. For this reason, by using the determination increase amount and the determination difference in the precharge process, it is possible to determine whether the system main relay is operating normally. When it may be determined that the system main relay is operating normally, the operation of the engine is allowed. In other words, it is possible to drive the hybrid vehicle by operating the engine.

On the other hand, even when the execution time of the precharge process reaches the determination execution time, but when the amount of increase in the capacitor voltage due to execution of the precharge process is not greater than or equal to the determination increase amount or when the difference between the direct-current voltage of the high-voltage battery and the capacitor voltage is not less than or equal to the determination difference, it may be determined that the system main relay is not operating normally. As a result, the operation of the engine is prohibited in such cases. For this reason, it is possible to prevent the hybrid vehicle from being driven in a situation in which the system main relay does not operate normally.

The hybrid vehicle to which one mode of the drive system is applied may be the hybrid vehicle configured such that an output shaft of the engine and the motor are coupled to each other via a clutch, and the electrically-powered device may be a DC-DC converter configured to step down the direct-current voltage of the high-voltage battery and input the stepped-down direct-current voltage to a low-voltage battery. In this case, the controller may be configured to, in the engine starting process, drive a starter motor with electric power supplied from the low-voltage battery to start the engine.

With the above configuration, in the voltage reduction process, it is possible to discharge the capacitor by driving the DC-DC converter.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart illustrating a process routine that is executed by the controller when the power switch is turned on.

DETAILED DESCRIPTION OF EMBODIMENTS

Figure 1:
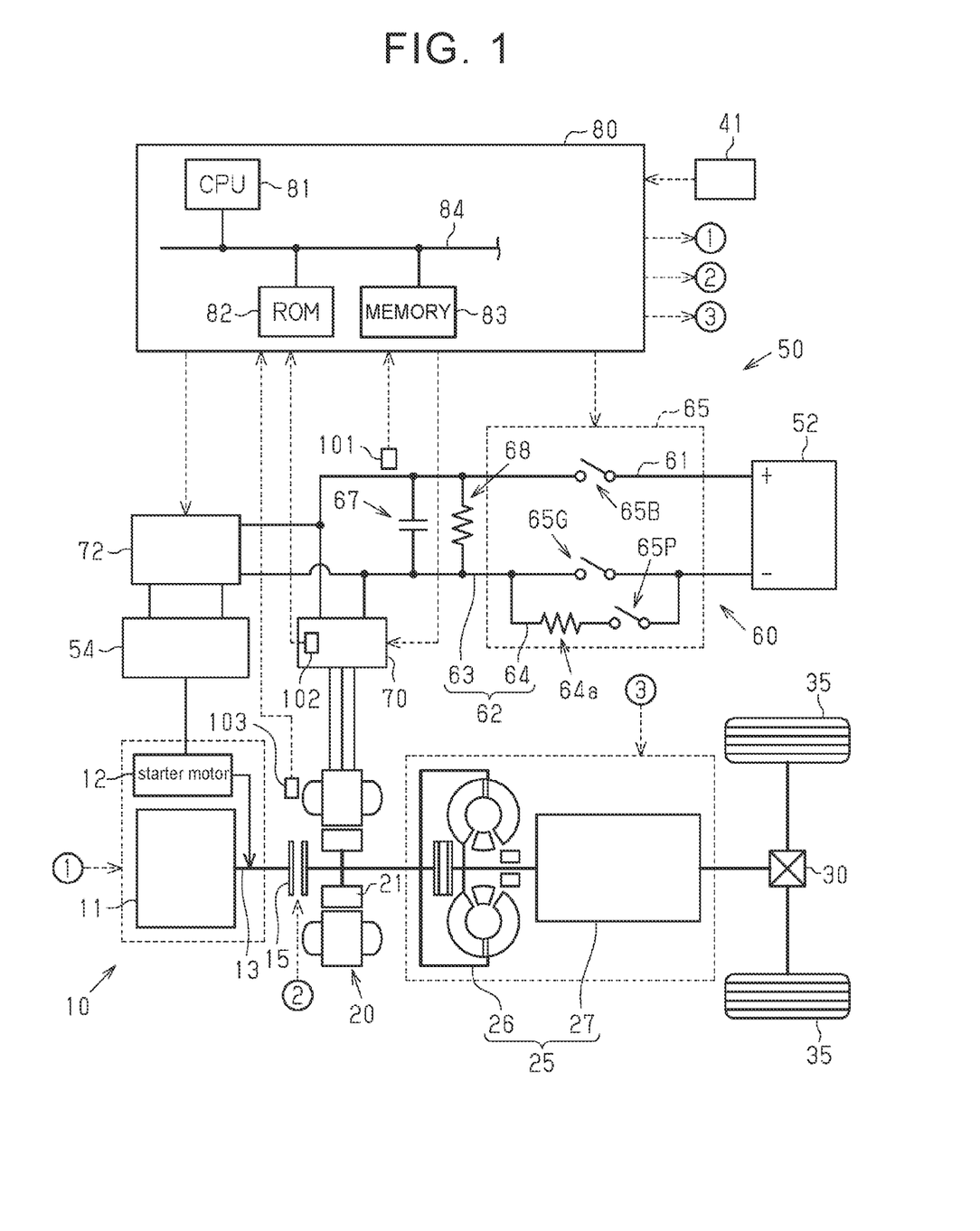
FIG. 1 is a configuration diagram schematically showing a hybrid vehicle including a drive system of an embodiment.

Hereinafter, an embodiment of a drive system for a hybrid vehicle will be described with reference to FIG. 1 to FIG. 5. FIG. 1 shows a hybrid vehicle 10 on which the drive system 50 of the present embodiment is mounted. A hybrid system of the hybrid vehicle 10 includes an engine 11 and a motor generator 20 as power sources of the vehicle. The engine 11 is provided with a starter motor 12 as an auxiliary. The starter motor 12 is driven by using electric power supplied from an on-board low-voltage battery 54. An output shaft 13 of the engine 11 is coupled to the motor generator 20 via a clutch 15. The output torque of the engine 11 and/or motor generator 20 is transmitted to a plurality of drive wheels 35 via an automatic transmission 25 and a differential 30. The automatic transmission 25 includes a torque converter 26 coupled to the motor generator 20 and a transmission 27 disposed between the torque converter 26 and the differential 30. The transmission 27 may be a step transmission or may be a continuously variable transmission.

Next, the drive system 50 of the present embodiment will be described. The drive system 50 includes a drive circuit 60 and a controller 80. The drive circuit 60 includes an inverter 70 that drives the motor generator 20 by converting a high direct-current voltage VB that is the direct-current voltage of an on-board high-voltage battery 52 to an alternating-current voltage and outputting the alternating-current voltage to the motor generator 20. A positive electrode of the high-voltage battery 52 and the inverter 70 are connected by a positive power line 61, and a negative electrode of the high-voltage battery 52 and the inverter 70 are connected by a negative power line 62. The negative power line 62 includes a main negative power line 63 and a sub-negative power line 64. A first end of the main negative power line 63 is connected to the high-voltage battery 52, and a second end of the main negative power line 63 is connected to the inverter 70. A first end of the sub-negative power line 64 is connected to the main negative power line 63. A second end of the sub-negative power line 64 is connected to a portion between the inverter 70 and a portion at which the main negative power line 63 is connected to the first end of the sub-negative power line 64. A resistor 64a is provided in the sub-negative power line 64.

A system main relay 65 is provided in a power supply path from the high-voltage battery 52 to the inverter 70. The system main relay 65 has three switches 65B, 65G, 65P. Of the three switches 65B, 65G, 65P, the switch 65B is disposed in the positive power line 61, and the switches 65G, 65P are disposed in the negative power line 62. Specifically, the switch 65G is disposed in the main negative power line 63, and the switch 65P is disposed in the sub-negative power line 64. In the present embodiment, the switch 65B corresponds to a first switch disposed in the positive power line 61. The switches 65G, 65P correspond to second switches disposed in the negative power line 62.

A capacitor 67 and a discharge resistor 68 are disposed between the system main relay 65 and the inverter 70 in the power supply path. A first end of the capacitor 67 is connected to the positive power line 61, and a second end of the capacitor 67 is connected to the negative power line 62. A first end of the discharge resistor 68 is connected to the positive power line 61, and a second end of the discharge resistor 68 is connected to the negative power line 62. In other words, the discharge resistor 68 is disposed in parallel with the capacitor 67.

The drive circuit 60 includes a DC-DC converter 72 that steps down the high direct-current voltage VB of the high-voltage battery 52 and inputs the stepped-down high direct-current voltage VB to the low-voltage battery 54. The DC-DC converter 72 is connected to both a portion between the switch 65B and the inverter 70 in the positive power line 61 and a portion between the switches 65G, 65P and the inverter 70 in the negative power line 62. In the present embodiment, the DC-DC converter 72 is connected to both a portion between the inverter 70 and a portion of the positive power line 61, connected to the capacitor 67, and a portion between the inverter 70 and a portion of the negative power line 62, connected to the capacitor 67. Therefore, even when the system main relay 65 is in an interrupted state, that is, all the switches 65B, 65G, 65P are in an off state, the DC-DC converter 72 is able to be driven by using the voltage of the capacitor 67.

Detection signals are input from various sensors to the controller 80. The sensors may include a voltage sensor 101, a current sensor 102, a rotational angle sensor 103, and the like. The voltage sensor 101 detects a capacitor voltage VH that is the voltage of the capacitor 67 and outputs a signal corresponding to a detection result as a detection signal. The current sensor 102 detects a motor current Img that is a current flowing through the motor generator 20 and outputs a signal corresponding to a detection result as a detection signal. The rotational angle sensor 103 outputs a signal corresponding to the rotation speed of a rotor 21 of the motor generator 20 as a detection signal.

The controller 80 includes a CPU 81, ROM 82, and memory 83 and is configured such that the CPU 81, the ROM 82, and the memory 83 are able to communicate via a local network 84. A control program that is executed by the CPU 81 is stored in the ROM 82. For example, various parameter values derived in the processes in which the CPU 81 executes the control program are stored in the memory 83. The controller 80 controls the operation of the engine 11, the drive of the motor generator 20, the drive of the clutch 15, and the drive of the automatic transmission 25 by causing the CPU 81 to execute the control program.

The controller 80 receives an operating signal from a power switch 41 installed in the hybrid vehicle 10. The power switch 41 is an operating unit that is operated by a driver of the hybrid vehicle 10 at the time of starting up the hybrid system or stopping the drive of the hybrid system. In other words, when the power switch 41 is changed from an on state to an off state in a state where the hybrid system is being driven, the drive of the hybrid system is stopped. On the other hand, when the power switch 41 is changed from the off state to the on state in a state where the hybrid system is stopped, the hybrid system starts up.

Figure 2:
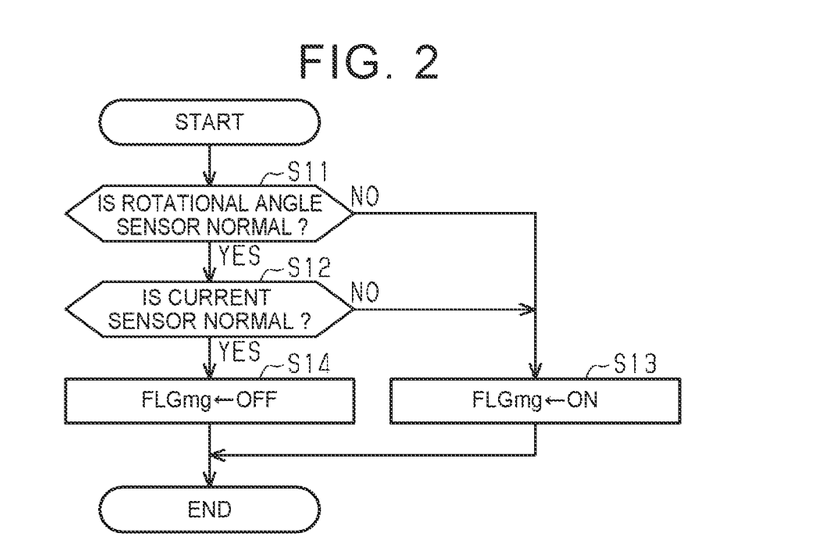
FIG. 2 is a flowchart illustrating a process routine that is executed by a controller of the drive system to diagnose whether an abnormality is occurring in a motor generator.

Next, a process routine that is executed at the time of diagnosing whether an abnormality is occurring in the motor generator 20 will be described with reference to FIG. 2. The process routine is repeatedly executed in each predetermined control cycle when the hybrid system is being driven.

In the process routine, in step S11, it is determined whether the rotational angle sensor 103 is normal. When, for example, a change in the rotational angle of the rotor 21 cannot be detected from a detection signal of the rotational angle sensor 103 in a situation in which the motor generator 20 is being driven, the rotational angle sensor 103 is not normal. When it is not determined that the rotational angle sensor 103 is normal (NO in S11), the process proceeds to step S13 (described later). On the other hand, when it is determined that the rotational angle sensor 103 is normal (YES in S11), the process proceeds to the next step S12.

In step S12, it is determined whether the current sensor 102 is normal. When, for example, a change in the detection signal of the current sensor 102 resulting from the drive of the inverter 70 cannot be detected in a situation in which the inverter 70 is being driven, the current sensor 102 is not normal. When it is not determined that the current sensor 102 is normal (NO in S12), the process proceeds to the next step S13.

In step S13, a motor abnormality flag FLGmg is set to an on state. The motor abnormality flag FLGmg is set to an on state when it is diagnosed that an abnormality is occurring in the motor generator 20; whereas the motor abnormality flag FLGmg is set to an off state when it is diagnosed that the motor generator 20 is normal. When setting of the motor abnormality flag FLGmg completes, the process routine is once ended.

On the other hand, when it is determined in step S12 that the current sensor 102 is normal (YES), the process proceeds to the next step S14. In step S14, the motor abnormality flag FLGmg is set to the off state. Then, the process routine is once ended.

In the present embodiment, when the rotational angle sensor 103 or the current sensor 102 is not normal, it is difficult to appropriately drive the motor generator 20, so it is diagnosed that an abnormality is occurring in the motor generator 20, and the motor abnormality flag FLGmg is set to the on state. On the other hand, when both the current sensor 102 and the rotational angle sensor 103 are normal, it is diagnosed that no abnormality is occurring in the motor generator 20, and the motor abnormality flag FLGmg is set to the off state. Therefore, the process routine shown in FIG. 2 corresponds to a motor abnormality diagnosis process of diagnosing whether an abnormality is occurring in the motor generator 20.

Figure 3:
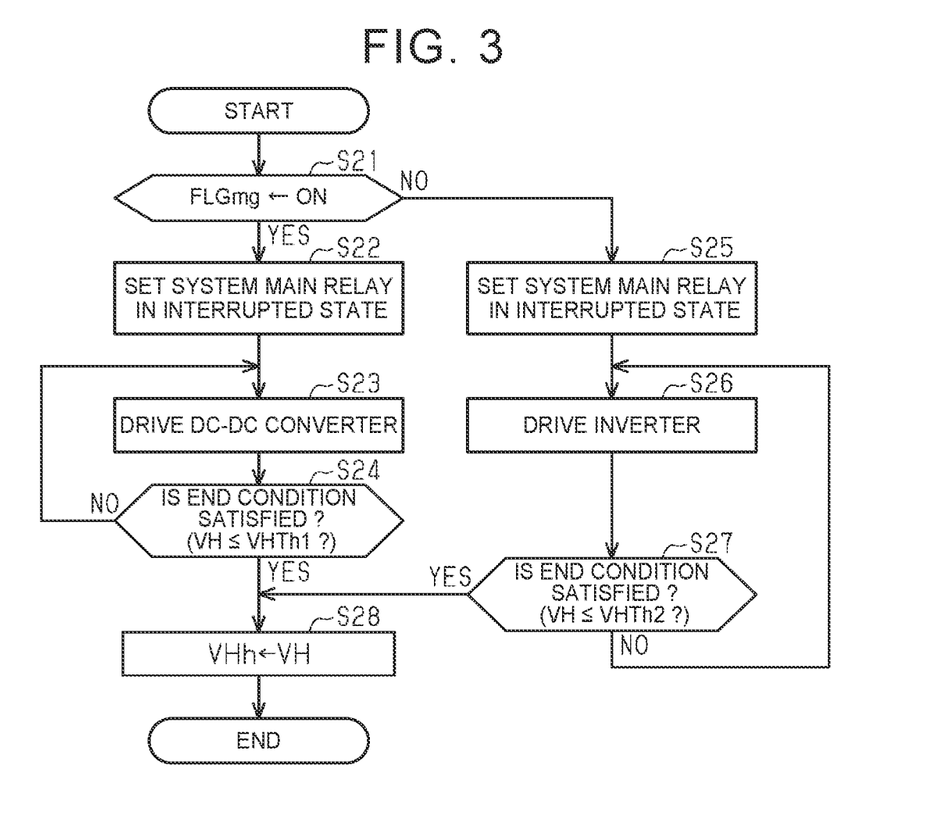
FIG. 3 is a flowchart illustrating a process routine that is executed by the controller when a power switch is turned off.

Next, a process routine that is executed by the controller 80 at the time when the power switch 41 is changed from the on state to the off state in a situation in which the hybrid system is being driven will be described with reference to FIG. 3.

In the process routine, in step S21, it is determined whether the motor abnormality flag FLGmg is in the on state. When the motor abnormality flag FLGmg is in the on state, it means that it has been diagnosed through the motor abnormality diagnosis process that an abnormality is occurring in the motor generator 20. When the motor abnormality flag FLGmg is in the on state (YES in S21), a first voltage reduction process that is a voltage reduction process to be used when the motor generator 20 is abnormal is executed.

In the first voltage reduction process, in the initial step S22, the system main relay 65 is set to an interrupted state. In other words, all the switches 65B, 65G, 65P of the system main relay 65 are set to the off state. Subsequently, in step S23, the DC-DC converter 72 is driven. In other words, even when the system main relay 65 is in the interrupted state, an electric charge is stored in the capacitor 67. For this reason, it is possible to drive the DC-DC converter 72 by using the voltage of the capacitor 67. In this way, the capacitor voltage VH is reduced by driving the DC-DC converter 72. In other words, in the present embodiment, the DC-DC converter 72 is an example of an electrically-powered device that is driven at the time of reducing the capacitor voltage VH.

In step S24, it is determined whether an end condition for the first voltage reduction process is satisfied. It is known that, when the voltage input to the DC-DC converter 72 becomes lower than or equal to a predetermined voltage, the DC-DC converter 72 is not driven normally. Therefore, when the capacitor voltage VH is lower than or equal to a first end determination voltage VHTh1, it is determined that the end condition is satisfied. On the other hand, when the capacitor voltage VH is higher than the first end determination voltage VHTh1, it is not determined that the end condition is satisfied. The same voltage as the predetermined voltage or a voltage slightly higher than the predetermined voltage is set as the first end determination voltage VHTh1. In other words, the first end determination voltage VHTh1 corresponds to a prescribed voltage.

When the end condition for the first voltage reduction process is not satisfied because the capacitor voltage VH is higher than the first end determination voltage VHTh1 (NO in S24), the process proceeds to step S23. In other words, the capacitor voltage VH is continuously reduced by driving the DC-DC converter 72. On the other hand, when the end condition for the first voltage reduction process is satisfied because the capacitor voltage VH becomes lower than or equal to the first end determination voltage VHTh1 (YES in S24), the first voltage reduction process is ended. In other words, the first voltage reduction process is a process of, when the power switch 41 is changed from the on state to the off state in a situation in which it has been diagnosed through the motor abnormality diagnosis process that an abnormality is occurring in the motor generator 20, driving the DC-DC converter 72 until the capacitor voltage VH becomes lower than or equal to the first end determination voltage VHTh1. Then, the process proceeds to step S28 (described later).

On the other hand, when the motor abnormality flag FLGmg is in the off state (NO) in step S21, a second voltage reduction process that is a voltage reduction process used when the motor generator 20 is normal is executed.

In the second voltage reduction process, in the initial step S25, as in the case of step S22, the system main relay 65 is set to an interrupted state. Subsequently, in step S26, the inverter 70 is driven. In other words, even when the system main relay 65 is in the interrupted state, an electric charge is stored in the capacitor 67. For this reason, it is possible to drive the inverter 70 by using the voltage of the capacitor 67. In this way, the capacitor voltage VH is reduced by driving the inverter 70.

In step S27, it is determined whether an end condition for the second voltage reduction process is satisfied. In the present embodiment, when the capacitor voltage VH is lower than or equal to a second end determination voltage VHTh2, it is determined that the end condition is satisfied. On the other hand, when the capacitor voltage VH is higher than the second end determination voltage VHTh2, it is not determined that the end condition is satisfied. A value lower than the first end determination voltage VHTh1 is set as the second end determination voltage VHTh2. The second end determination voltage VHTh2 is set to a level such that, even when, for example, a person touches the capacitor 67 in the case where the capacitor voltage VH is equal to the second end determination voltage VHTh2, the person does not receive an electric shock.

When the end condition for the second voltage reduction process is not satisfied because the capacitor voltage VH is higher than the second end determination voltage VHTh2 (NO in S27), the process proceeds to step S26. In other words, the capacitor voltage VH is continuously reduced by driving the inverter 70. On the other hand, when the end condition for the second voltage reduction process is satisfied because the capacitor voltage VH becomes lower than or equal to the second end determination voltage VHTh2 (YES in S27), the second voltage reduction process is ended. Then, the process proceeds to step S28 (described later).

In step S28, the capacitor voltage VH at this time is stored in the memory 83 as a reference capacitor voltage VHh. After that, the process routine is ended. Then, the hybrid system is stopped.

Figure 4:
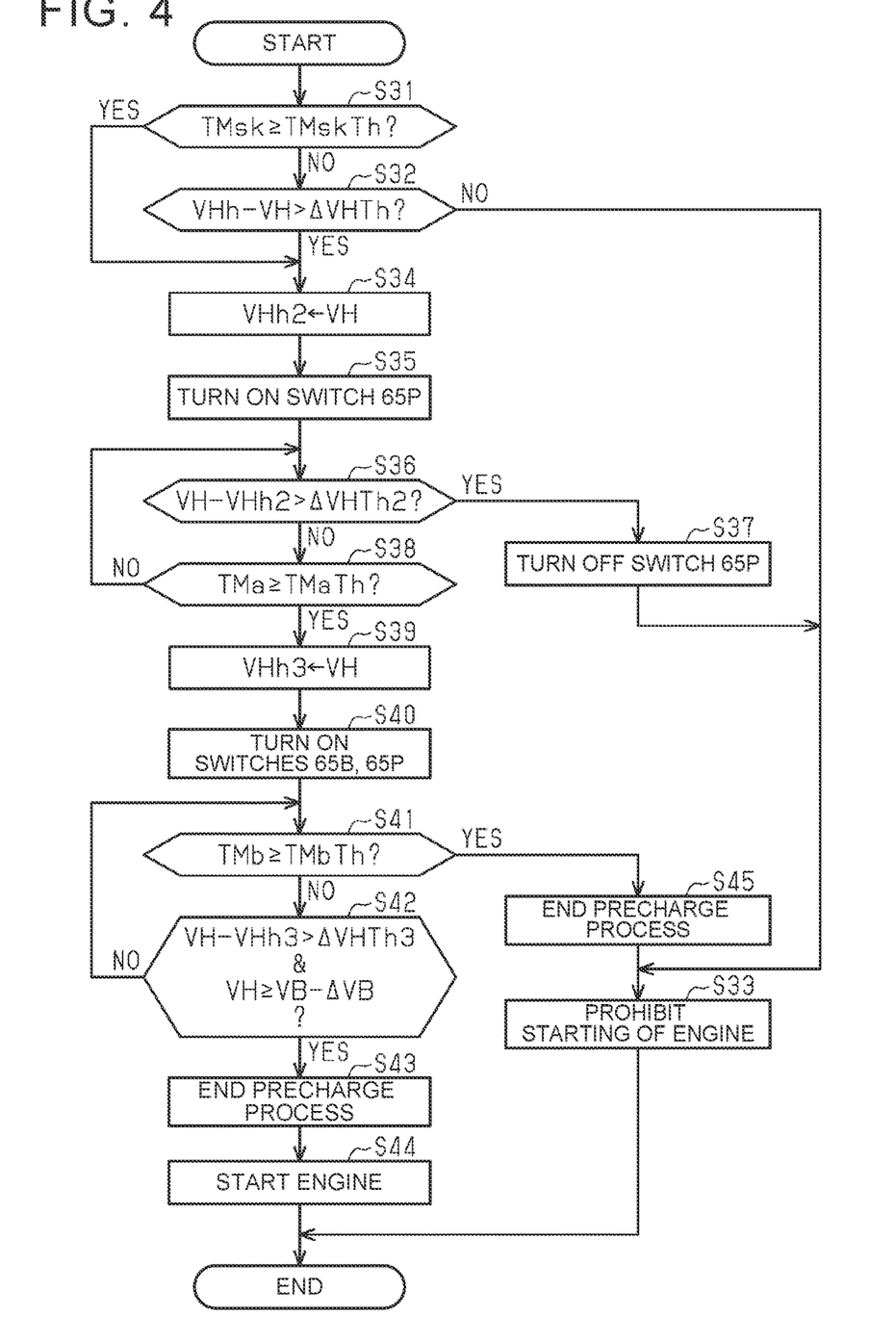

Next, a process routine that is executed by the controller 80 at the time when the power switch 41 is changed from the off state to the on state in a situation in which the hybrid system is stopped will be described with reference to FIG. 4. In the process routine, in step S31, it is determined whether a soak time TMsk is longer than or equal to a determination time TMskTh. A soak time TMsk is an elapsed time from an end of the voltage reduction process executed at the time when the power switch 41 is turned off last time. The voltage reduction process at the time of turning off the power switch 41 last time may be the first voltage reduction process or may be the second voltage reduction process.

Here, as shown in FIG. 1, in the drive circuit 60, the discharge resistor 68 is disposed in parallel with the capacitor 67. For this reason, even when the system main relay 65 is in an interrupted state, a natural discharge of the capacitor 67 occurs. In other words, the voltage of the capacitor 67 decreases with time. When the first voltage reduction process is executed at the time of turning off the power switch 41 last time, the capacitor voltage VH at the time when the drive of the hybrid system is stopped last time is higher than the capacitor voltage VH when the second voltage reduction process is executed. Therefore, even when the voltage reduction process executed at the time of turning off the power switch 41 last time is the first voltage reduction process, the determination time TMskTh is set as a determination criterion as to whether the voltage of the capacitor 67 is sufficiently low at the time when the power switch 41 is turned on this time. For this reason, when the soak time TMsk is longer than or equal to the determination time TMskTh, the voltage of the capacitor 67 should be sufficiently low. On the other hand, when the soak time TMsk is shorter than the determination time TMskTh, the voltage of the capacitor 67 at the current point in time is not regarded as being sufficiently low.

Referring back to FIG. 4, when the soak time TMsk is longer than or equal to the determination time TMskTh (YES in S31), it is determined that the capacitor voltage VH is reduced as compared to the capacitor voltage VH at the end of the last voltage reduction process, and the process proceeds to step S34 (described later). On the other hand, when the soak time TMsk is shorter than the determination time TMskTh (NO in S31), the process proceeds to the next step S32. In step S32, it is determined whether a value obtained by subtracting the capacitor voltage VH at the current point in time from the reference capacitor voltage VHh is greater than a determination reduction amount ΔVHTh. The reference capacitor voltage VHh is a capacitor voltage VH at the end of the last voltage reduction process. For this reason, a value obtained by subtracting the capacitor voltage VH at the current point in time from the reference capacitor voltage VHh is a voltage reduction amount that is the amount of reduction in capacitor voltage VH from the capacitor voltage VH at the end of the last voltage reduction process. Since the discharge resistor 68 is disposed in parallel with the capacitor 67 as described above, a natural discharge of the capacitor 67 should be occurring while the hybrid system is stopped. For this reason, when the voltage sensor 101 is normal, the capacitor voltage VH at the current point in time should be lower than the reference capacitor voltage VHh even when the soak time TMsk is shorter than the determination time TMskTh. On the other hand, when the voltage sensor 101 is not normal, the capacitor voltage VH at the current point in time may not be lower than the reference capacitor voltage VHh. Therefore, when the voltage reduction amount that is a value obtained by subtracting the capacitor voltage VH at the current point in time from the reference capacitor voltage VHh is greater than the determination reduction amount ΔVHTh, it is determined that the voltage sensor 101 is normal. On the other hand, when the voltage reduction amount is less than or equal to the determination reduction amount ΔVHth, it is determined that the voltage sensor 101 may not be normal.

Therefore, when the voltage reduction amount is greater than the determination reduction amount ΔVHTh (YES in S32), it is determined that the capacitor voltage VH is reduced as compared to the capacitor voltage VH at the end of the last voltage reduction process even when the soak time TMsk is shorter than the determination time TMskTh, and the process proceeds to step S34. On the other hand, when the voltage reduction amount is less than or equal to the determination reduction amount ΔVHTh (NO in S32), it is not determined that the capacitor voltage VH is reduced as compared to the capacitor voltage VH at the end of the last voltage reduction process, so the process proceeds to step S33.

In step S33, starting the engine 11 is prohibited. Then, the process routine is ended. In the present embodiment, when at least one of the condition that the soak time TMsk is longer than or equal to the determination time TMskTh and the condition that the voltage reduction amount is greater than the determination reduction amount ΔVHTh is satisfied, it is determined that the capacitor voltage VH is reduced as compared to the capacitor voltage VH at the end of the last voltage reduction process. On the other hand, when both the condition that the soak time TMsk is longer than or equal to the determination time TMskTh and the condition that the voltage reduction amount is greater than the determination reduction amount ΔVHTh are not satisfied, it is not determined that the capacitor voltage VH is reduced as compared to the capacitor voltage VH at the end of the last voltage reduction process. Thus, in the present embodiment, step S31 and step S32 correspond to a voltage reduction determination process of, when the power switch 41 is changed from the off state to the on state, determining whether the capacitor voltage VH is reduced as compared to the capacitor voltage VH at the end of the last voltage reduction process. The voltage reduction determination process composed of step S31 and step S32 is an example of a starting check process of, when the power switch 41 is changed from the off state to the on state, checking the drive circuit 60.

In step S34, the capacitor voltage VH at the end of the voltage reduction determination process is stored in the memory 83 as an on time capacitor voltage VHh2. Then, when the voltage reduction determination process is ended, a relay abnormality determination process is executed. The relay abnormality determination process is a process of determining whether the capacitor voltage VH increases in a state where, of the switches 65B, 65G, 65P of the system main relay 65, only one switch is turned on. Such a relay abnormality determination process is also an example of the starting check process.

In the relay abnormality determination process, in the initial step S35, of the switches 65B, 65G, 65P, the switch 65P is turned on, and the off states of the other switches 65B, 65G are maintained.

When the switch 65B is in the off state normally, the high direct-current voltage VB of the high-voltage battery 52 is not input to the capacitor 67 even when the switch 65P is turned on. In other words, the capacitor voltage VH should not increase. However, when a welding abnormality is occurring in the switch 65B, the switch 65B cannot be turned off, so a closed loop circuit including the capacitor 67 and the high-voltage battery 52 is established by turning on the switch 65P. As a result, the high direct-current voltage VB of the high-voltage battery 52 is input to the capacitor 67, with the result that the capacitor voltage VH increases.

Therefore, in step S36, it is determined whether a voltage increase amount that is a value obtained by subtracting the on time capacitor voltage VHh2 from the capacitor voltage VH at the current point in time is greater than a determination voltage increase amount ΔVHTh2. The determination voltage increase amount ΔVHTh2 is set as a determination criterion as to whether the capacitor voltage VH increases by turning on only the switch 65P of the switches 65B, 65G, 65P. For this reason, when the voltage increase amount is greater than the determination voltage increase amount ΔVHTh2, it is determined that the capacitor voltage VH is increased in a state where, of the switches 65B, 65G, 65P, only the switch 65P is turned on. On the other hand, when the voltage increase amount is less than or equal to the determination voltage increase amount ΔVHTh2, it is not determined that the capacitor voltage VH is increased in a state where, of the switches 65B, 65G, 65P, only the switch 65P is turned on.

When the voltage increase amount is greater than the determination voltage increase amount ΔVHTh2 (YES in S36), the process proceeds to the next step S37. In step S37, the switch 65P is set to the off state, and the relay abnormality determination process is ended. Then, the process proceeds to step S33, and starting the engine 11 is prohibited in step S33. In other words, when it is determined that the system main relay 65 is abnormal, starting the engine 11 is prohibited. After that, the process routine is ended.

On the other hand, when the voltage increase amount is less than or equal to the determination voltage increase amount ΔVHTh2 (NO) in step S36, the process proceeds to the next step S38. In step S38, it is determined whether an execution time TMa of the relay abnormality determination process is longer than or equal to a determination execution time TMaTh. The determination execution time TMaTh is to determine the end timing of the relay abnormality determination process. When the execution time TMa is shorter than the determination execution time TMaTh (NO in S38), the process proceeds to step S36. In other words, the relay abnormality determination process is continuously executed. On the other hand, when the execution time TMa is longer than or equal to the determination execution time TMaTh (YES in S38), the relay abnormality determination process is ended, and the process proceeds to the next step S39.

In step S39, the capacitor voltage VH at the current point in time is stored in the memory 83 as a pre-charge capacitor voltage VHh3. Then, a precharge process is executed. In other words, in the present embodiment, on condition that it is not determined through the relay abnormality determination process that the capacitor voltage VH increases, the precharge process is executed. The precharge process is a process of increasing the capacitor voltage VH by setting the switches 65B, 65P of the switches 65B, 65G, 65P of the system main relay 65 to the on state. In the precharge process, the off state of the switch 65G is maintained.

In the precharge process, in the initial step S40, while the off state of the switch 65G is maintained, the switches 65B, 65P are turned on. In step S41, it is determined whether an execution time TMb of the precharge process is longer than or equal to a determination execution time TMbTh. When the execution time TMb is shorter than the determination execution time TMbTh (NO in S41), the process proceeds to the next step S42. In step S42, it is determined whether both the condition that a charge voltage increase amount that is a value obtained by subtracting the pre-charge capacitor voltage VHh3 from the capacitor voltage VH at the current point in time is greater than a determination increase amount ΔVHTh3 and the condition that the capacitor voltage VH at the current point in time is higher than or equal to a value obtained by subtracting a determination difference ΔVB from the high direct-current voltage VB are satisfied. The determination difference ΔVB is set to a value corresponding to the resistance value of the resistor 64a provided in the sub-negative power line 64. For this reason, when the capacitor voltage VH at the current point in time is higher than or equal to a value obtained by subtracting the determination difference ΔVB from the high direct-current voltage VB, the capacitor voltage VH may be regarded as being substantially equal to the high direct-current voltage VB. The determination increase amount ΔVHTh3 is provided as a determination criterion as to whether the capacitor voltage VH is increased as a result of execution of the precharge process.

When both the condition that the charge voltage increase amount is greater than the determination increase amount ΔVHTh3 and the condition that the capacitor voltage VH at the current point in time is higher than or equal to a value obtained by subtracting the determination difference ΔVB from the high direct-current voltage VB are satisfied (YES in S42), the process proceeds to the next step S43. In step S43, the precharge process is ended. In other words, in the present embodiment, when both the condition that the amount of increase in capacitor voltage VH due to execution of the precharge process is greater than or equal to the determination increase amount ΔVHTh3 and the condition that the difference between the high direct-current voltage VB and the capacitor voltage VH is less than or equal to the determination difference ΔVB are satisfied before the execution time TMb of the precharge process reaches the determination execution time TMbTh, the precharge process is ended. Then, when the precharge process is ended, of the switches 65B, 65G, 65P of the system main relay 65, the switch 65P is set to the off state, and the other switches 65B, 65G are set to the on state. After that, the process proceeds to step S44. In step S44, the engine 11 is started by driving the starter motor 12. At this time, in a state where coupling of the engine 11 and the motor generator 20 is released by the clutch 15, the engine 11 is started. When starting of the engine 11 completes, the clutch 15 is placed in an engaged state, and the output torque of the engine 11 is transmitted to the automatic transmission 25 via the clutch 15. Then, the process routine is ended.

On the other hand, when the execution time TMb of the precharge process is longer than or equal to the determination execution time TMbTh (YES) in step S41, the process proceeds to the next step S45. Then, in step S45, the precharge process is ended. In this way, when the precharge process is ended, all the switches 65B, 65G, 65P of the system main relay 65 are set to the off state. After that, the process proceeds to step S33, and starting of the engine 11 is prohibited. Then, the process routine is ended. In other words, in the present embodiment, when at least one of the condition that the amount of increase in capacitor voltage VH due to execution of the precharge process is greater than or equal to the determination increase amount ΔVHTh3 and the condition that the difference between the high direct-current voltage VB and the capacitor voltage VH is less than or equal to the determination difference ΔVB is not satisfied even when the execution time TMb of the precharge process reaches the determination execution time TMbTh, the precharge process is ended, and the operation of the engine 11 is prohibited.

In the present embodiment, when the operation of the engine 11 is prohibited as a result of execution of step S33, a notification to the effect that it is not possible to start up the hybrid system, that is, it is not possible to drive the hybrid vehicle 10, is provided to a driver.

Next, the operation and advantageous effects of the present embodiment will be described with reference to FIG. 5. When the power switch 41 is turned off by operation of a driver in a situation in which it has been diagnosed that an abnormality is occurring in the motor generator 20, the first voltage reduction process is executed (S22, S23, and S24). In the first voltage reduction process, the capacitor 67 is discharged by driving the DC-DC converter 72. When the capacitor voltage VH becomes lower than or equal to the first end determination voltage VHTh1, the first voltage reduction process is ended (YES in S24). As a result, the drive of the hybrid system is stopped.

When no abnormality is occurring in the system main relay 65 or the discharge resistor 68 while the drive of the hybrid system is stopped, the capacitor 67 is naturally discharged. In other words, the capacitor voltage VH decreases.

When the power switch 41 is changed from the off state to the on state, the voltage reduction determination process is executed as the starting check process (S31, and S32). In the voltage reduction determination process, it is determined whether the capacitor voltage VH is reduced as compared to the capacitor voltage VH at the end of the last voltage reduction process. In other words, when the soak time TMsk that is an elapsed time from the end of the last voltage reduction process is longer than or equal to the determination time TMskTh (YES in S31), it may be determined that the capacitor voltage VH is sufficiently reduced while the drive of the hybrid system is stopped. As a result, it is determined whether the capacitor voltage VH is reduced as compared to the capacitor voltage VH at the end of the last voltage reduction process.

Even when the soak time TMsk is shorter than the determination time TMskTh (NO in S31), but when a value obtained by subtracting the capacitor voltage VH from the reference capacitor voltage VHh is greater than the determination reduction amount ΔVHTh (YES in S32), it is determined that the capacitor voltage VH is reduced as compared to the capacitor voltage VH at the end of the last voltage reduction process.

On the other hand, when a value obtained by subtracting the capacitor voltage VH from the reference capacitor voltage VHh is less than or equal to the determination reduction amount ΔVHTh (NO in S32), the capacitor 67 may not be discharged because of an abnormality in the drive circuit 60 or a decrease in the voltage of the capacitor 67 may not be detected because of an abnormality in the voltage sensor 101. When, for example, the discharge resistor 68 breaks, a natural discharge of the capacitor 67 almost does not occur during a stop of the drive of the hybrid system. Also, when, for example, an abnormality occurs in the system main relay 65, a closed loop circuit including the high-voltage battery 52 and the capacitor 67 is established, so the high direct-current voltage VB of the high-voltage battery 52 can be continuously input to the capacitor 67 during a stop of the drive of the hybrid system. In this case, the voltage of the capacitor 67 does not decrease during a stop of the drive of the hybrid system.

Therefore, in the present embodiment, when the soak time TMsk is shorter than the determination time TMskTh (NO in S31), and when a value obtained by subtracting the capacitor voltage VH from the reference capacitor voltage VHh is less than or equal to the determination reduction amount ΔVHTh (NO in S32), it may be determined that an abnormality is occurring in the drive circuit 60. For this reason, starting the engine 11 is prohibited (S33). In other words, it is possible to prevent the hybrid vehicle 10 from being driven in a situation in which an abnormality is occurring in the voltage sensor 101 or an abnormality is occurring in the drive circuit 60.

Figure 5:
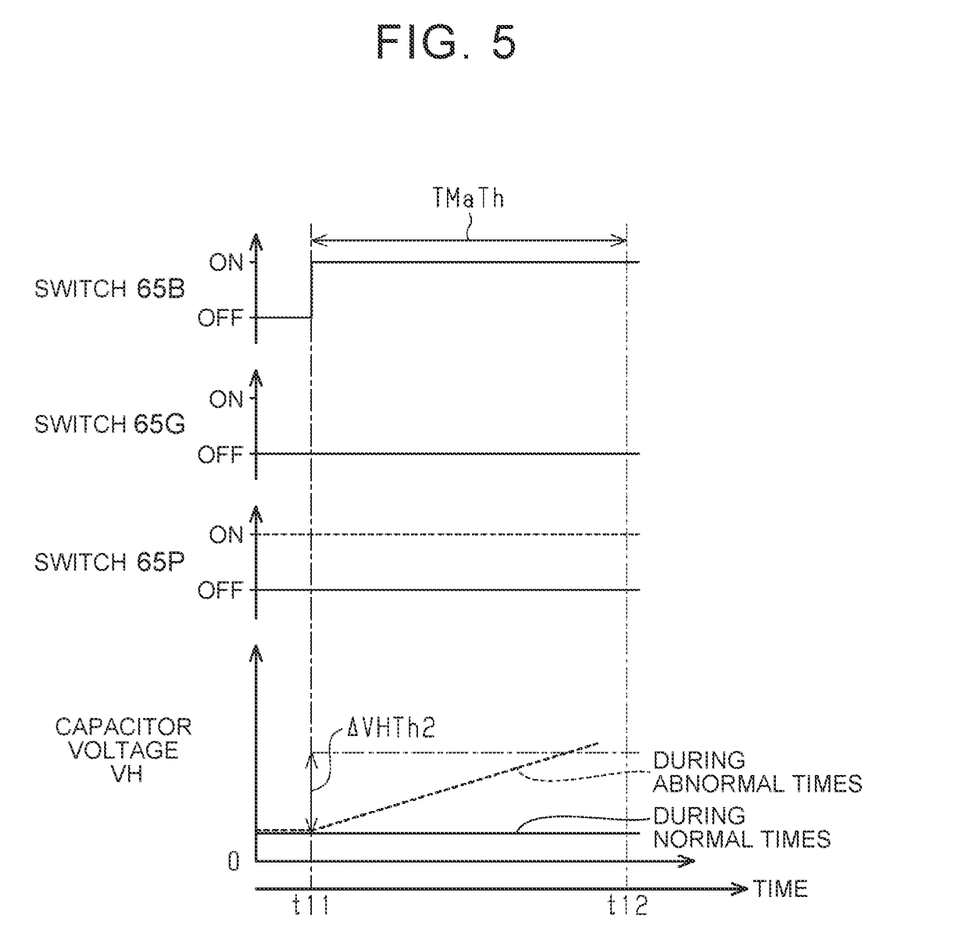
FIG. 5 is a timing chart at the time when a relay abnormality determination process is executed.

When it is determined through the voltage reduction determination process that the capacitor voltage VH is reduced, the relay abnormality determination process is executed as the starting check process (S35, S36, S37, and S38) In the example shown in FIG. 5, the relay abnormality determination process is started from time t11. In the relay abnormality determination process, of the switches 65B, 65G, 65P, only the switch 65P is turned on (S35). At this time, when no welding abnormality is occurring in the switch 65B, the capacitor voltage VH does not increase as represented by the continuous line in FIG. 5. On the other hand, when a welding abnormality is occurring in the switch 65B, the switch 65B cannot be turned off, so, when the switch 65P is turned on, a closed loop circuit including the high-voltage battery 52 and the capacitor 67 is established, and the high direct-current voltage VB of the high-voltage battery 52 is input to the capacitor 67. As a result, the capacitor voltage VH increases as represented by the dashed line in FIG. 5. Then, before time t12 at which the execution time TMa of the relay abnormality determination process reaches the determination execution time TMaTh, the amount of increase in capacitor voltage VH during the relay abnormality determination process becomes greater than the determination voltage increase amount ΔVHTh2 (YES in S36). In this case, it is determined that the capacitor voltage VH increases during execution of the relay abnormality determination process, so starting the engine 11 is prohibited (S33). Therefore, it is possible to prevent the hybrid vehicle 10 from being driven in a situation in which an abnormality is occurring in the system main relay 65.

When it is not determined through the relay abnormality determination process that the capacitor voltage VH is reduced (NO in S36, YES in S38), the starting check process is ended, and the precharge process is executed (S40, S41, and S42). Even when the execution time TMb of the precharge process reaches the determination execution time TMbTh (YES in S41), and when the amount of increase in capacitor voltage VH due to execution of the precharge process is not greater than or equal to the determination increase amount ΔVHTh3 or the difference between the high direct-current voltage VB and the capacitor voltage VH is not less than or equal to the determination difference ΔVB (NO in S42), an electric charge may be difficult to be stored in the capacitor 67 because the system main relay 65 is not operating normally. For this reason, the operation of the engine 11 is prohibited in such a case (S33). With this configuration, it is possible to prevent the hybrid vehicle 10 from being driven in a situation in which the system main relay 65 is not operating normally.

On the other hand, when the amount of increase in capacitor voltage VH due to execution of the precharge process is greater than or equal to the determination increase amount ΔVHTh3 and the difference between the high direct-current voltage VB and the capacitor voltage VH is less than or equal to the determination difference ΔVB (YES in S42), it may be determined that the system main relay 65 is operating normally. For this reason, the operation of the engine 11 is allowed.

In other words, in the present embodiment, even when the last voltage reduction process is the first voltage reduction process, but when any of the following conditions (Condition 1), (Condition 2), and (Condition 3) is satisfied, it is possible to drive the hybrid vehicle 10 by the operation of the engine 11.

(Condition 1) It is determined through the voltage reduction determination process that the capacitor voltage VH is reduced as compared to the capacitor voltage VH at the end of the last voltage reduction process.

(Condition 2) It is determined through the relay abnormality determination process that the capacitor voltage VH increases.

(Condition 3) Both the condition that the amount of increase in capacitor voltage VH due to execution of the precharge process is greater than or equal to the determination increase amount ΔVHTh3 and the condition that the difference between the high direct-current voltage VB and the capacitor voltage VH is less than or equal to the determination difference ΔVB are satisfied before the execution time TMb of the precharge process reaches the determination execution time TMbTh.

The above-describe embodiment may be modified as follows. The embodiment and the following modifications may be implemented in combination with each other without any technical contradiction. When at least one of the condition that the amount of increase in capacitor voltage VH due to execution of the precharge process is greater than or equal to the determination increase amount ΔVHTh3 and the condition that the difference between the high direct-current voltage VB and the capacitor voltage VH is less than or equal to the determination difference ΔVB is satisfied, it may be determined that the system main relay 65 is normal, the precharge process may be ended, and the operation of the engine 11 may be allowed.

In the above-described embodiment, after the end of the precharge process, the engine 11 is started. However, when the starting check process is complete and both the above-described conditions (Condition 1) and (Condition 2) are satisfied, the engine 11 may be started during execution of the precharge process or the precharge process may be executed after completion of starting of the engine 11. With this configuration, it is possible not to drive the hybrid vehicle 10.

In the precharge process, of the switches 65B, 65G, 65P of the system main relay 65, the off state of the switch 65P may be maintained, and then the switch 65B and the switch 65G may be turned on.

In the case of a modification in which the precharge process is executed after completion of starting of the engine 11, an abnormality in the system main relay 65 can be detected as a result of execution of the precharge process after completion of starting of the engine 11. In this case, in accordance with the fact that an abnormality of the system main relay 65 is detected as a result of execution of the precharge process, the operation of the engine 11 may be stopped to prohibit the operation of the engine 11.

When the hybrid vehicle 10 is equipped with a function capable of charging the low-voltage battery 54 other than a technique for driving the DC-DC converter 72, the operation of the engine 11 may be allowed even when an abnormality of the system main relay 65 is detected. Examples of the function capable of charging the low-voltage battery 54 other than a technique for driving the DC-DC converter 72 include driving an alternator that generates electric power by using the rotation of the output shaft 13 of the engine 11.

In the relay abnormality determination process, of the switches 65B, 65G, 65P of the system main relay 65, only the switch 65G may be turned on, or only the switch 65B may be turned on.

The relay abnormality determination process may include a first relay abnormality determination process of determining whether the capacitor voltage VH increases in a state where, of the switches 65B, 65G, 65P, only the switch 65B is turned on, a second relay abnormality determination process of determining whether the capacitor voltage VH increases in a state where only the switch 65G is turned on, and a third relay abnormality determination process of determining whether the capacitor voltage VH increases in a state where only the switch 65P is turned on.

The voltage reduction determination process may be a process not including a process of determining whether the soak time TMsk is longer than or equal to the determination time TMskTh. In this case, in the voltage reduction determination process, regardless of the length of the soak time TMsk, it is determined whether a value obtained by subtracting the capacitor voltage VH from the reference capacitor voltage VHh at that time is greater than the determination reduction amount ΔVHTh. Then, when the value obtained by subtracting the capacitor voltage VH from the reference capacitor voltage VHh is greater than the determination reduction amount ΔVHTh, it is determined that the capacitor voltage VH is reduced as compared to the capacitor voltage VH at the end of the last voltage reduction process.

When a different electrically-powered device able to be driven by the voltage of the capacitor 67 is provided other than the DC-DC converter 72, the capacitor voltage VH may be reduced by driving the different electrically-powered device other than the DC-DC converter 72 in the first voltage reduction process. The different electrically-powered device is connected to both the positive power line 61 and the negative power line 62 and just needs to be able to be driven by the controller 80. For example, in the vehicle described in JP 2005-229689 A, in the first voltage reduction process, the capacitor voltage VH may be reduced by driving an electric air conditioner.

The hybrid vehicle to which the controller 80 is applied may be a vehicle having a configuration different from the configuration shown in FIG. 1 as long as the vehicle includes the engine 11 and the motor generator 20 as the power sources of the vehicle.

The controller 80 may be configured as any one of the following (a) to (c).

(a) The controller 80 includes one or more processors that execute various processes in accordance with a computer program. Each processor includes a CPU and memory, such as RAM and ROM. The memory stores a program code or an instruction configured to cause the CPU to execute a process. The memory, that is, a computer-readable medium, includes any usable medium accessible by a general-purpose or dedicated computer.

(b) The controller 80 includes one or more dedicated hardware circuits that execute various processes. Examples of the dedicated hardware circuits include an application specific integrated circuit, that is, an ASIC or an FPGA. ASIC is an abbreviation of application specific integrated circuit, and FPGA is an abbreviation of field programmable gate array.

(c) The controller 80 includes a processor that executes part of various processes in accordance with a computer program and a dedicated hardware circuit that executes the remaining processes of the various processes.

What is claimed is:

1. A drive system applied to a hybrid vehicle including an engine and a motor as power sources of the vehicle, the drive system comprising:
a drive circuit connected to a high-voltage battery; and
a controller configured to control the engine and the motor, wherein:
the drive circuit includes
an inverter configured to drive the motor by converting a direct-current voltage of the high-voltage battery to an alternating-current voltage and outputting the alternating-current voltage to the motor,
a positive power line that is a power line connecting a positive electrode of the high-voltage battery and the inverter,
a negative power line that is a power line connecting a negative electrode of the high-voltage battery and the inverter,
a system main relay having a first switch disposed in the positive power line and a second switch disposed in the negative power line,
a capacitor disposed between the system main relay and the inverter in a power supply path from the high-voltage battery to the inverter, a first end of the capacitor being connected to the positive power line, a second end of the capacitor being connected to the negative power line,
a discharge resistor disposed in parallel with the capacitor,
a voltage sensor configured to detect a voltage of the capacitor as a capacitor voltage, and
an electrically-powered device connected to both a portion between the first switch and the inverter in the positive power line and a portion between the second switch and the inverter in the negative power line; and
the controller is configured to execute
a motor abnormality diagnosis process of diagnosing whether an abnormality is occurring in the motor,
a voltage reduction process of, when a power switch of the hybrid vehicle is changed from an on state to an off state in a situation in which it has been diagnosed through the motor abnormality diagnosis process that an abnormality is occurring in the motor, driving the electrically-powered device until the capacitor voltage becomes lower than or equal to a prescribed voltage,
a starting check process of, when the power switch is changed from the off state to the on state, checking the drive circuit, and
an engine starting process of starting the engine;
the starting check process includes a voltage reduction determination process of determining whether the capacitor voltage is reduced as compared to the capacitor voltage at an end of the last voltage reduction process; and
the controller is configured to, on condition that the controller determines through the voltage reduction determination process that the capacitor voltage is reduced as compared to the capacitor voltage at the end of the last voltage reduction process, execute the engine starting process.

2. The drive system according to claim 1, wherein the controller is configured to, in the voltage reduction determination process, when an elapsed time from the end of the last voltage reduction process is longer than or equal to a determination time, determine that the capacitor voltage is reduced as compared to the capacitor voltage at the end of the last voltage reduction process.

3. The drive system according to claim 2, wherein the controller is configured to, in the voltage reduction determination process, when a voltage reduction amount that is an amount of reduction in the capacitor voltage from the end of the last voltage reduction process is greater than or equal to a determination reduction amount, determine that the capacitor voltage is reduced as compared to the capacitor voltage at the end of the last voltage reduction process.

4. The drive system according to claim 3, wherein:
the controller is configured to execute a precharge process of increasing the capacitor voltage by setting both the first switch and the second switch in an on state;
the starting check process includes a relay abnormality determination process of determining whether the capacitor voltage increases in a state where only one of the first switch and the second switch is turned on; and
the controller is configured to
when the controller determines through the voltage reduction determination process that the capacitor voltage is reduced as compared to the capacitor voltage at the end of the last voltage reduction process, execute the relay abnormality determination process, and
on condition that the controller does not determine through the relay abnormality determination process that the capacitor voltage increases, execute the precharge process and the engine starting process.

5. The drive system according to claim 4, wherein:
the controller is configured to, when both a condition that an amount of increase in the capacitor voltage due to execution of the precharge process is greater than or equal to a determination increase amount and a condition that a difference between the direct-current voltage of the high-voltage battery and the capacitor voltage is less than or equal to a determination difference are satisfied before an execution time of the precharge process reaches a determination execution time, end the precharge process and allow operation of the engine; and
the controller is configured to, at least one of the condition that an amount of increase in the capacitor voltage due to execution of the precharge process is greater than or equal to the determination increase amount and the condition that a difference between the direct-current voltage of the high-voltage battery and the capacitor voltage is less than or equal to the determination difference is not satisfied even when the execution time of the precharge process reaches the determination execution time, end the precharge process and prohibit operation of the engine.

6. The drive system according to claim 1, wherein:
the hybrid vehicle is configured such that an output shaft of the engine and the motor are coupled to each other via a clutch;
the electrically-powered device is a DC-DC converter configured to step down the direct-current voltage of the high-voltage battery and input the stepped-down direct-current voltage to a low-voltage battery; and
the controller is configured to, in the engine starting process, drive a starter motor with electric power supplied from the low-voltage battery to start the engine.

* * * * *